US011102023B2

(12) United States Patent
Nakahara et al.

(10) Patent No.: US 11,102,023 B2
(45) Date of Patent: *Aug. 24, 2021

(54) OPTIMIZED UTILIZATION OF STREAMING BANDWIDTH USING MULTICAST

(71) Applicant: Google LLC, Mountain View, CA (US)

(72) Inventors: Tyrone Nakahara, San Carlos, CA (US); Stella Loh, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,594

(22) Filed: Dec. 4, 2019

(65) Prior Publication Data
US 2020/0106629 A1 Apr. 2, 2020

Related U.S. Application Data

(63) Continuation of application No. 15/834,589, filed on Dec. 7, 2017, now Pat. No. 10,735,213.
(Continued)

(51) Int. Cl.
*G06F 15/16* (2006.01)
*H04L 12/18* (2006.01)
(Continued)

(52) U.S. Cl.
CPC .......... *H04L 12/185* (2013.01); *H04L 43/10* (2013.01); *H04L 61/2069* (2013.01); *H04L 65/4076* (2013.01); *H04N 21/812* (2013.01)

(58) Field of Classification Search
CPC ... H04L 12/185; H04L 43/10; H04L 61/2069; H04L 65/4076; H04N 21/812
(Continued)

(56) References Cited

U.S. PATENT DOCUMENTS 7,983,205 B1 7/2011 Blease et al.
9,503,691 B2 11/2016 Lawrence-Apfelbaum et al.
(Continued)

FOREIGN PATENT DOCUMENTS

CN 103609164 2/2014
CN 106165434 11/2016
(Continued)

OTHER PUBLICATIONS

KR Office Action in Korean Application No. 10-2019-7004042, dated Jan. 21, 2020, 6 pages (with English translation).
(Continued)

*Primary Examiner* — Dustin Nguyen
*Assistant Examiner* — Joel Mesa
(74) *Attorney, Agent, or Firm* — Fish & Richardson P.C.

(57) ABSTRACT

A system including a digital component request server that receives digital component requests for a supplemental digital component that will be presented in an additional multicast stream that is different to a multicast stream that is delivering content; a digital component distribution server that i) selects supplemental digital components to distribute over the additional multicast streams, the supplemental digital components being selected for one of the additional multicast streams being different to the supplemental digital component selected for each of the other additional multicast streams, and that ii) assigns one group of a plurality of groups of the multiple client devices to a respective one of the additional multicast streams; and an instruction generation server that generates instructions for the multiple client devices to tune to the respective additional multicast streams assigned to the group of multiple client devices that includes the different client device that submitted the request.

20 Claims, 5 Drawing Sheets

Related U.S. Application Data

(60) Provisional application No. 62/545,830, filed on Aug. 15, 2017.

(51) Int. Cl.
*H04L 29/12* (2006.01)
*H04L 12/26* (2006.01)
*H04N 21/81* (2011.01)
*H04L 29/06* (2006.01)

(58) Field of Classification Search
USPC .................................. 709/219, 217
See application file for complete search history.

(56) References Cited

U.S. PATENT DOCUMENTS

| | | | |
|---|---|---|---|
| 2009/0210899 A1* | 8/2009 | Lawrence-Apfelbaum | H04N 21/4334 725/34 |
| 2010/0111085 A1* | 5/2010 | Bauchot | H04N 21/812 370/390 |
| 2014/0150019 A1* | 5/2014 | Ma | H04L 65/602 725/34 |
| 2017/0041129 A1 | 2/2017 | Nekhamkin et al. | |
| 2017/0063960 A1 | 3/2017 | Stockhammer et al. | |

FOREIGN PATENT DOCUMENTS

| | | |
|---|---|---|
| JP | 2001-223732 | 8/2001 |
| JP | 2004-178031 | 6/2004 |
| JP | 2005-303454 | 10/2005 |
| JP | 2015-535353 | 12/2015 |
| JP | 2017-507387 | 3/2017 |
| WO | WO 2014/179218 | 11/2014 |
| WO | WO 2015/099815 | 7/2015 |

OTHER PUBLICATIONS

International Preliminary Report on Patentability in International Application No. PCT/US2017/065128, dated Feb. 18, 2020, 9 pages.
International Search Report and Written Opinion issued in International Application No. PCT/US2017/065128, dated Apr. 16, 2018, 14 pages.
JP Office Action in Japanese Application No. 2019-505254, dated Jul. 29, 2019, 7 pages (with English translation).
CN Office Action in Chinese Application No. 201780053312.0, dated Aug. 31, 2020, 13 pages (with English translation).
KR Office Action in Korean Application No. 10-2020-7014905, dated Aug. 20, 2020, 11 pages (with English translation).
JP Office Action in Japanese Application No. 2019-222946, dated Mar. 30, 2021, 12 pages (with English translation).

\* cited by examiner

OPTIMIZED UTILIZATION OF STREAMING BANDWIDTH USING MULTICAST

CROSS-REFERENCE TO RELATED APPLICATION

This application is a continuation application of, and claims priority to, U.S. patent application Ser. No. 15/834,589, titled "OPTIMIZED UTILIZATION OF STREAMING BANDWIDTH USING MULTICAST," filed on Dec. 7, 2017, which application claims the benefit under 35 U.S.C. § 119(e) of U.S. Patent Application No. 62/545,830, entitled "Optimized Utilization Of Streaming Bandwidth Using Multicast," filed Aug. 15, 2017, which is incorporated herein by reference in its entirety.

BACKGROUND

This document discloses improved techniques for utilizing available streaming bandwidth using multicast techniques. As a larger amount of content is streamed over network connections, and the number of streaming devices being serviced increases, techniques are being developed to better utilize the limited bandwidth and/or channels that are available to deliver streaming content.

SUMMARY

Multicast streams are also used for distributing supplemental content, in addition to main content, to be rendered on streaming devices. However, existing systems require several multicast streams to be created to enable such streaming of supplemental content, whether in real time or at certain defined or ad hoc intervals. This can present a number of problems relating to bandwidth availability and seamless playback of main and supplemental content, and can lead to overstretching the network resources and computing resources available for such streaming. The present application attempts to provide techniques for overcoming these drawbacks to ensure optimized and seamless playback of main and supplemental content by managing the manner in which supplemental content is assigned for multicast streams.

Innovative aspects of the subject matter described in this specification may be embodied in systems that include a digital component request server that receives, from each of multiple client devices, a digital component request for a supplemental digital component that will be presented in an additional multicast stream that is different to a multicast stream that is delivering streaming content to the respective client device, wherein a number of additional multicast streams that are capable of being distributed to the multiple client devices over an available bandwidth is less than a total number of the multiple client devices; a digital component distribution server that i) selects supplemental digital components to distribute over at least a portion of each of the additional multicast streams that are capable of being distributed, the supplemental digital components being selected for a respective one of the additional multicast streams being different to the supplemental digital component selected for each of the other additional multicast streams, and that ii) assigns one group of a plurality of groups of the multiple client devices to a respective one of the additional multicast streams that distribute the supplemental digital components, each said group being assigned an additional multicast stream that is different to the additional multicast stream assigned to each of the other groups of multiple client devices; an instruction generation server that generates instructions for each of the multiple client devices to tune to the respective additional multicast streams assigned to the group of multiple client devices that includes the different client device that submitted the request; and a ping address generation server that generates a client configurable ping address that includes a placeholder for insertion of a device identifier by the client device that submitted the request.

Other embodiments of these aspects include corresponding methods and computer programs, configured to perform the actions of the methods, encoded on computer storage devices.

These and other embodiments may each optionally include one or more of the following features. For instance, at least one group of the multiple client devices includes two or more different client devices. The multicast stream is delivering a same main streaming content to each of the multiple client devices. The step of receiving the digital component requests further includes receiving, for at least one digital component request, multiple device identifiers in the digital component request, wherein the multiple different device identifiers specify multiple client devices that are to be provided a same digital component on a same additional multicast stream. A number of the digital component requests is less than the total number of the multiple client devices.

Innovative aspects of the subject matter described in this specification may be embodied in methods that include the actions of receiving, by one or more computers and from each of multiple client devices, a digital component request for a supplemental digital component that will be presented in an additional multicast stream that is different to a multicast stream that is delivering streaming content to the respective client device; determining, by the one or more computers, a number of additional multicast streams that are capable of being distributed to the multiple client devices over an available bandwidth when the digital component requests are received, wherein the number of additional multicast streams is less than a total number of the multiple client devices; selecting, by the one or more computers, in response to the requests, supplemental digital components to distribute over at least a portion of each of the additional multicast streams that are capable of being distributed, the supplemental digital components being selected for a respective one of the additional multicast streams being different to the supplemental digital component selected for each of the other additional multicast streams; assigning, by the one or more computers, one group of a plurality of groups of the multiple client devices to a respective one of the additional multicast streams that distribute the supplemental digital components, each said group being assigned an additional multicast stream that is different to the additional multicast stream assigned to each of the other groups of multiple client devices; and responding, by the one or more computers and to the multiple client devices, to each of the received requests with (i) data that instructs each of the multiple client devices to tune to the respective additional multicast stream that was assigned to the group of multiple client devices that includes the client device that submitted the request, and (ii) a client configurable ping address that includes a placeholder for insertion of a device identifier by the client device that submitted the request.

Other embodiments of these aspects include corresponding systems, apparatus, and computer programs, configured to perform the actions of the methods, encoded on computer storage devices.

These and other embodiments may each optionally include one or more of the following features. For instance, at least one group of the groups of multiple client includes two or more different client devices. The multicast stream is delivering a same main streaming content to each of the multiple different client devices. Receiving the digital component requests further includes receiving, for at least one digital component request, multiple device identifiers in the digital component request, wherein the multiple device identifiers specify multiple different devices that are to be provided a same digital component on a same additional multicast stream. A number of the digital component requests is less than the total number of the multiple client devices. For one or more of the multiple client devices, receiving, at a destination specified by the client configurable ping address, a notification that the client device tuned to the additional multicast broadcast that was assigned to the respective group that includes the client device that submitted the client configurable ping address; and storing the client configurable ping addresses in a database. Assigning further includes assigning each group of the plurality of groups to different one of the additional multicast streams based on one or more parameters associated with the respective group. The parameters can include demographic profile characteristics associated with the multiple client devices in the respective group. Assigning further includes assigning each group of the plurality of groups to different ones of the additional multicast streams, wherein the method further comprises excluding a particular client device from inclusion within the each of the different groups.

Innovative aspects of the subject matter described in this specification may be embodied in systems that include a digital component request server that receives, from multiple different client devices, separate digital component requests for a supplemental digital component that will be presented in a different multicast stream than a multicast stream that is delivering streaming content to the multiple different client devices, wherein a number of additional multicast streams that are capable of being distributed to the multiple different client devices over an available bandwidth is less than a total number of the multiple different client devices; a digital component distribution server that i) selects multiple different supplemental digital components to distribute over at least a portion of the additional multicast streams that are capable of being distributed and that ii) assigns different groups of the multiple different client devices to different ones of the additional multicast streams that transport the multiple different supplemental digital components; an instruction generation server that generates instructions for each of the multiple different client devices to tune to one of the additional multicast streams that was assigned to the different groups that includes the different client device that submitted the request; and a ping address generation server that generates a client configurable ping address that includes a placeholder for insertion of a device identifier by the different client device that submitted the request.

Other embodiments of these aspects include corresponding methods and computer programs, configured to perform the actions of the methods, encoded on computer storage devices.

These and other embodiments may each optionally include one or more of the following features. For instance, at least one group of the different groups includes two or more different client devices. The multicast stream is delivering a same streaming content to each of the multiple different client devices. Receiving, for at least one digital component request, multiple device identifiers in the digital component request, wherein the multiple different device identifiers specify multiple different devices that are to be provided a same digital component on a same additional multicast stream. A number of the digital component requests is less than the total number of the multiple different client devices.

Innovative aspects of the subject matter described in this specification may be embodied in methods that include the actions of receiving, by one or more computers and from multiple different client devices, separate digital component requests for a supplemental digital component that will be presented in a different multicast stream than a multicast stream that is delivering streaming content to the multiple different client devices; determining, by the one or more computers, a number of additional multicast streams that are capable of being distributed to the multiple different client devices over an available bandwidth when the digital component requests are received, wherein the number of additional multicast streams is less than a total number of the multiple different client devices; selecting, by the one or more computers, in response to the separate requests, multiple different supplemental digital components to distribute over at least a portion of the additional multicast streams that are capable of being distributed; assigning, by the one or more computers, different groups of the multiple different client devices to different ones of the additional multicast streams that transport the multiple different supplemental digital components; and responding, by the one or more computers and to the multiple different client devices, to each of the separate requests with (i) data that instructs each of the multiple different client devices to tune to one of the additional multicast streams that was assigned to the different groups that includes the different client device that submitted the request, and (ii) a client configurable ping address that includes a placeholder for insertion of a device identifier by the different client device that submitted the request.

Other embodiments of these aspects include corresponding systems, apparatus, and computer programs, configured to perform the actions of the methods, encoded on computer storage devices.

These and other embodiments may each optionally include one or more of the following features. For instance, at least one group of the different groups includes two or more different client devices. The multicast stream is delivering a same streaming content to each of the multiple different client devices. Receiving the separate digital component requests further includes receiving, for at least one digital component request, multiple device identifiers in the digital component request, wherein the multiple different device identifiers specify multiple different devices that are to be provided a same digital component on a same additional multicast stream. A number of the digital component requests is less than the total number of the multiple different client devices. For one or more of the multiple client devices, receiving, at a destination specified by the client configurable ping address, a notification that the different client device tuned to the additional multicast broadcast that was assigned to the different group that includes the different client device that submitted the client configurable ping address; and storing the client configurable ping addresses in a database. Assigning further includes assigning the different groups to different ones of the additional multicast streams based on one or more parameters associated with each group. The parameters can include demographic profile characteristics associated with the multiple different client devices. Assigning the different groups of the multiple different client devices to different ones of the additional multicast streams further comprises excluding a particular client device from inclusion within the each of the different groups Particular implementations of the subject matter described in this specification can be implemented so as to realize one or more of the following advantages. Implementations of the present disclosure provide allocation of digital components to multiple client devices when bandwidth for providing such is limited between the client devices and a server computing system providing the digital components. Specifically, linear delivery of video digital components to the multiple client devices can be limited by bandwidth allocation when each of the multiple client devices request supplemental digital content (displayed by the multiple client devices) that can be personalized to one or more of the client devices. To efficiently utilize the available bandwidth, the server computing system can distribute the supplemental digital components to the multiple client devices using multicast delivery such that multiple configurations of the supplemental digital components are provided to differing subsets of the client devices.

A given multicast channel can deliver supplemental digital components to a group of client devices, while a different multicast channel can deliver different supplemental digital components to a different group of client devices, thereby enabling the two different groups of client devices to be provided different supplemental digital components at substantially the same time. When the group of client devices and the different group of client devices are all tuned to a same streaming channel (e.g., viewing a same program), the group of client devices can be instructed to tune to the given multicast channel for a period of time in order to present the supplemental digital components, while the different group of client devices can be instructed to tune to the different multicast channel for the same period of time in order to present the different supplemental digital components. At the end of the period of time, all of the client devices can return to the same streaming channel to continue presentation of content being delivered on that same streaming channel. As such, during the same period of time, the two different groups of client devices can be tuned to different respective streaming channels to enable different content to be presented by those different groups of client devices. Utilizing multicast streams to deliver supplemental digital components prevents the client devices from having to store the supplemental digital components. Meanwhile, tuning groups of client devices to a same multicast channel enables a larger number of client devices to be serviced (e.g., relative to using unicast channels) in a bandwidth constrained environment, while still enabling different client devices (e.g., that are all tuned to, or accessing, a same streaming channel) to be provided different supplemental digital components. Despite the fact that all client devices that are tuned to a same streaming channel are provided the same supplemental digital components, client device specific reporting of presentation of the supplemental digital component is enabled through the use of a configurable ping address that includes a placeholder, which enables each different client device to insert its unique device identifier into the ping address.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Figure 1A:
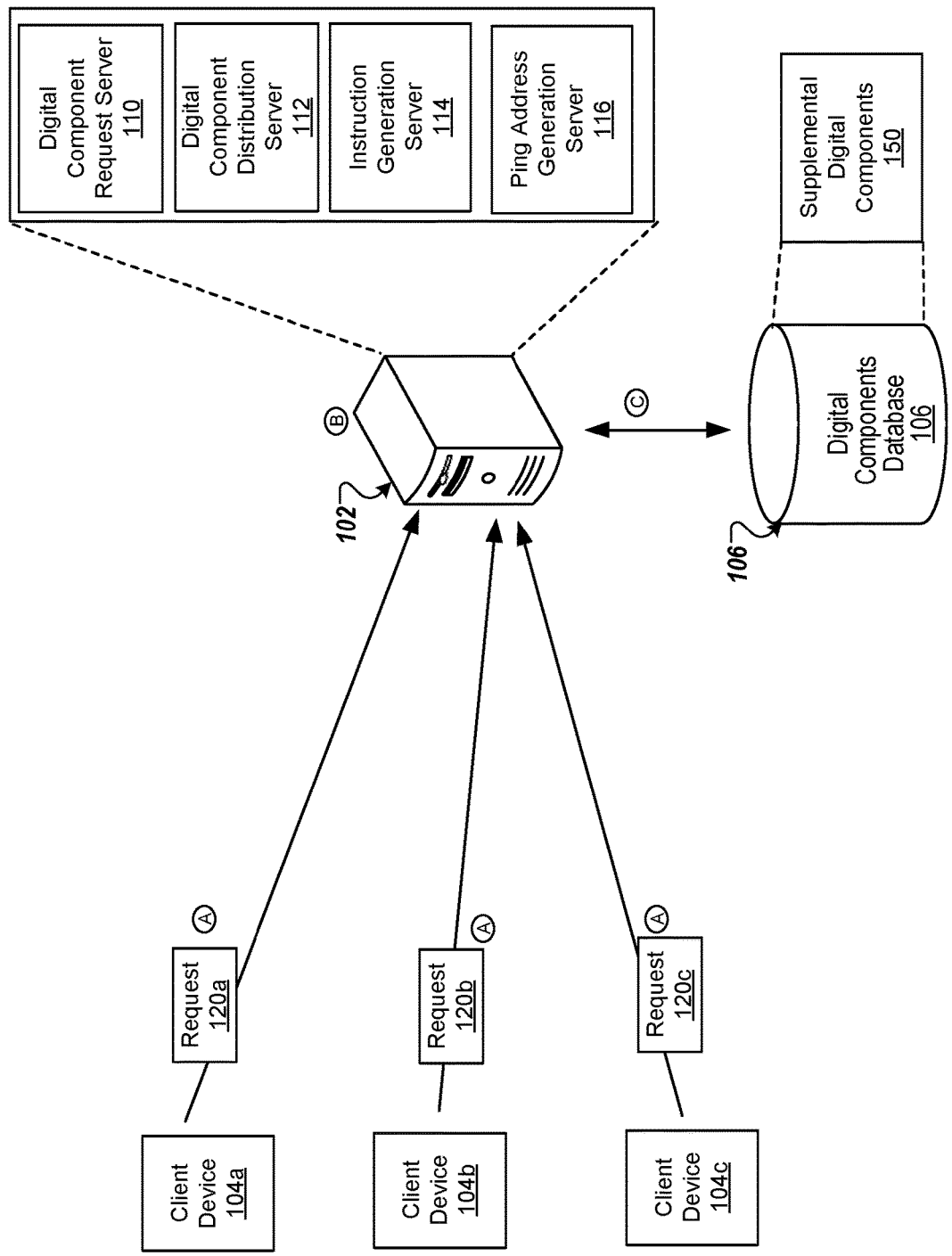
FIGS. 1A, 1B illustrate an environment multicast delivery of digital components.

This document describes methods, systems, and computer readable medium that provides multicast delivery of digital components during transmission of given streaming content over a particular streaming channel (e.g., a channel different than the multicast channel that is used to deliver the digital components). The utilization of multicast streams to deliver digital components enables different digital components to be delivered to different ones of the client devices that are streaming the other streaming content during a same time period. Specifically, at a beginning of the period of time, some of the client devices can be instructed to tune to a particular streaming channel that is delivering a given digital component, while others of the client devices can be instructed to tune to a different streaming channel that is delivering a different digital component. At the end of the period, all of the client devices can tune back to the particular streaming channel to continue presentation of the given streaming content. This utilization of multicast channels to deliver the digital components enables personalization of the digital components provided to the various client devices, while efficiently utilizing available bandwidth in a bandwidth limited environment. As discussed in more detail below, a configurable ping address can be used to enable each of the client devices to individually report presentation of a particular digital component at that client device, even when that particular digital component is delivered by way of a multicast stream (e.g., instead of a unicast stream or otherwise being addressed to that client device).

In some implementations, systems described herein receive, from multiple different client devices, separate digital component requests for a supplemental digital component that will be presented in a different multicast stream than a multicast stream that is delivering streaming content to the multiple different client devices. The systems further determine a number of additional multicast streams that are capable of being distributed to the multiple different client devices over an available bandwidth when the digital component requests are received, wherein the number of additional multicast streams is less than a total number of the multiple different client devices. The systems further select in response to the separate requests, multiple different supplemental digital components to distribute over at least a portion of the additional multicast streams that are capable of being distributed. The systems further assign different groups of the multiple different client devices to different ones of the additional multicast streams that transport the multiple different supplemental digital components. The systems further respond, to the multiple different client devices, to each of the separate requests with (i) data that instructs each of the multiple different client devices to tune to one of the additional multicast streams that was assigned to the different groups that includes the different client device that submitted the request, and (ii) a client configurable ping address that includes a placeholder for insertion of a device identifier by the different client device that submitted the request.

Figure 1B:
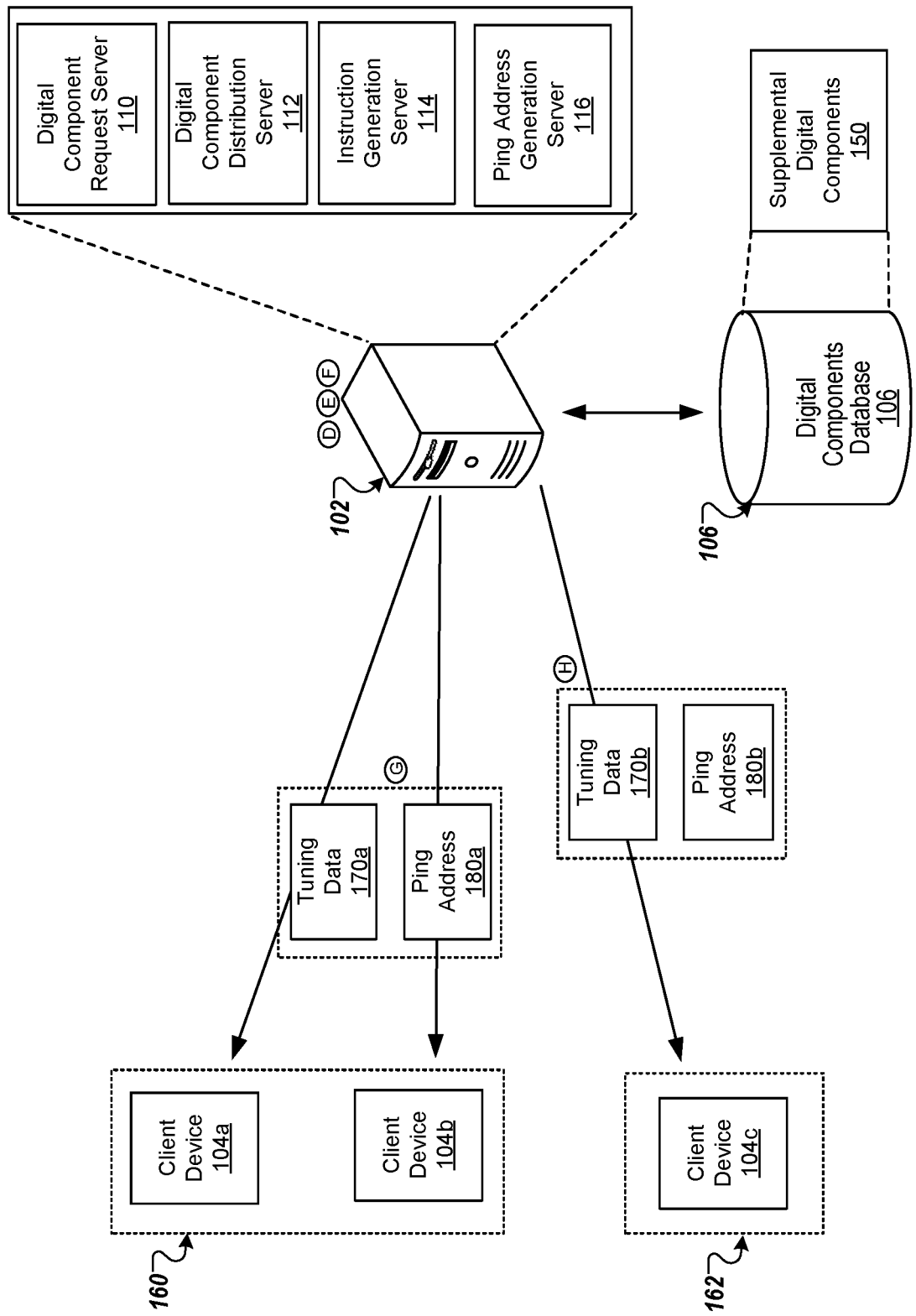

FIGS. 1A, 1B illustrate an environment 100 for multicast delivery of digital components. The environment 100 includes a server computing system 102, client computing devices 104a, 104b, 104c (collectively referred to as client computing devices 104), and a digital components database 106. The server computing system 102 includes a digital component request server 110, a digital component distribution server 112, an instruction generation sever 114, and a ping address generation sever 116. Each of the digital component request server 110, the digital component distribution server 112, the instruction generation server 114, and the ping address generation sever 116 can be a separate server computing system, or a combination of server computing systems. In some implementations, each of the digital component request server 110, the digital component distribution server 112, the instruction generation server 114, and the ping address generation sever 116 can be implemented in a same set of physical hardware. The server computing system 102 is in communication with the client computing devices 104 and the digital components database 106, e.g., over one or more networks.

Referring to FIG. 1A, each of the client computing devices 104 is receiving a multicast stream that is delivering streaming content to the client computing devices 104 (e.g., from a third party content provider). For example, the streaming content can be video content, audio content, textual content, image content, or a combination of various content types. In some examples, the multicast stream is delivering a same streaming content to each of the client computing devices 104. For example, each of the client computing devices 104 is tuned to a sports broadcast that the multicast stream is delivering substantially simultaneously to each of the client computing devices 104.

Each client device 104 can be a computing device that is capable of presenting streaming content or delivering streaming content to a display device. For example, each client device 104 may be a media streaming device, a computer, a smart phone, a tablet device, or a personal digital assistant. In some implementations, the personal digital assistant is a device that includes a microphone and a speaker, and enables a user to vocally submit commands and be presented audio and/or visual information in response to the commands. For example, the digital assistant can include a microphone through which the user can vocally submit the commands, and can include a speaker through which audio information is provided to the user. The personal digital assistant can include an embedded display or be wirelessly coupled to a display to enable visual information to be presented to the user either in combination with presentation of the audio information or separately from the audio information. For brevity, the term "client computing device" is used throughout this document and is intended to refer to any of the types of client devices discussed above.

Figure 2:
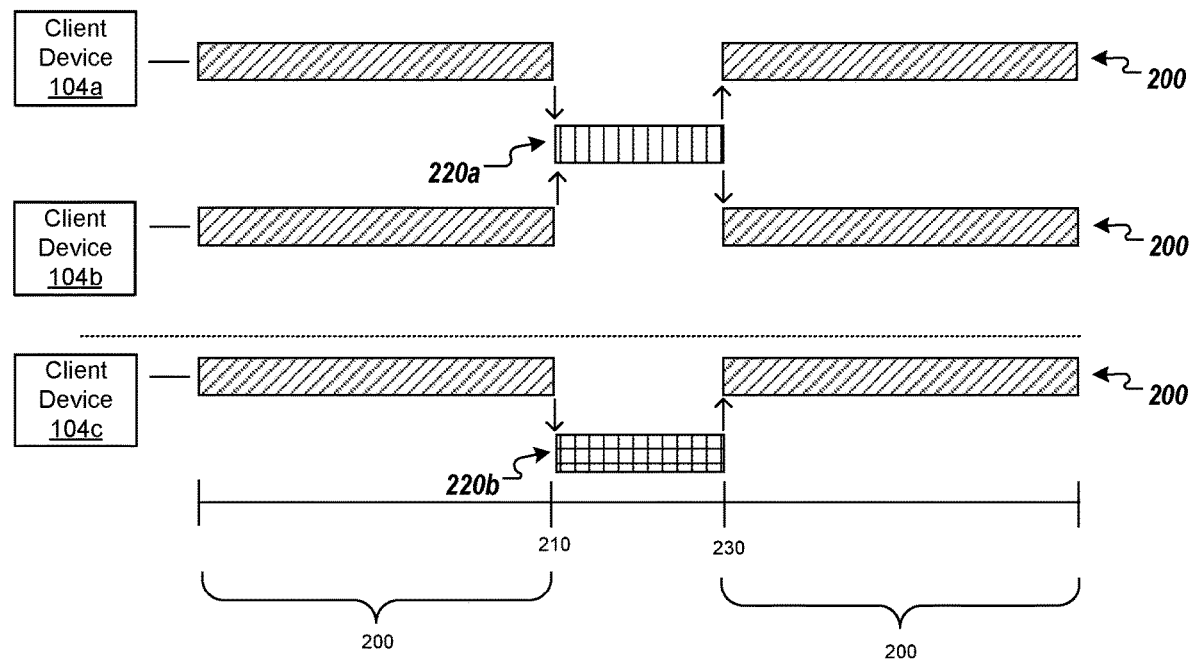
FIG. 2 illustrates example multicast streams that provide digital components to client computing devices.

Referring to FIG. 2, illustrates an example of a multicast stream 200 that is delivering streaming content to the client computing devices 104. That is, the multicast stream 200 is delivering a same streaming content to each of the client computing devices 104 at substantially the same time. In other words, each of the client computing devices 104 is tuned to the same multicast stream—for example, each of the client computing devices 104 are tuned to a multicast stream (e.g., live linear video) that is delivering a live sporting event.

Referring to FIG. 1A, the server computing system 102, and in particular, the digital component request server 110, receives digital component requests 120a, 120b, 120c (collectively referred to as digital component requests 120) from client computing devices 104a, 104b, 104c, respectively (operation A). For example, at point 210 during the multicast stream 200, the client computing devices 104 respectively provide the digital component requests 120 to the server computing system 102. In some examples, the point 210 can be representative of a streaming content break of the multicast stream 200—e.g., during a timeout of the live sporting event or a break in streaming content of the live sporting event. In some examples, the client computing devices 104 respectively provide the digital component requests 120 to the server computing system 102 at substantially the same time (e.g., triggered by a cue tone included in the multicast stream 200). In some examples, the client computing devices 104 respectively provide the digital component requests 120 to the server computing system 102 at a similar time in view of any respective latency issues of the client computing devices 104, the server computing system 102, and/or the network between the respective client computing devices 104 and the server computing system 102.

The digital component requests 120 are requests for supplemental digital components that will be presented in a different multicast stream than the multicast stream 200. In some examples, the different multicast stream is provided by a different third party content provider than the third party content provider providing the multicast stream 200. The supplemental digital components can include text, image, video, or multimedia digital content. In some examples, the digital components can include advertisements.

In some examples, each of the digital component requests 120 include a device identifier of the respective client computing device 104 making the digital component request 120. In some examples, one or more of the digital component requests 120 can include multiple device identifiers that specify multiple client computing devices 104 (e.g., batched requests). For example, a particular digital component request 120 can include device identifiers for client computing devices 104a and 104b. The digital component request 120 that includes multiple device identifiers includes the request for the same supplemental digital component on a same additional multicast stream, described further herein. In some examples, one or more of the digital component requests 120 can include multiple device identifiers that specify multiple client computing devices 104 to efficient utilize available bandwidth in a bandwidth limited environment (e.g., environment 100).

In some examples, the number of digital component requests 120 is less than the total number of client computing devices 104. That is, when a particular digital component request 120 includes multiple device identifiers, the number of digital component requests 120 is less than the number of client computing devices 104. For example, a particular digital component request 120 can include device identifiers for client computing device 104a and 104b, and thus, the number of digital component requests 120 (two digital component requests 120) is less than the number of client computing devices 104 (three client computing devices 104).

The server computing system 102 determines the number of additional multicast streams that are capable of being distributed to the client computing devices 104 (operation B), e.g., over an available bandwidth between the respective client computing devices 104 and the server computing system 102. Specifically, only a specific number of (different) multicast streams are capable of being distributed to the client computing devices 104 (e.g., due to bandwidth constraints or streaming hardware constraints that limit the number of separate streams that can be output by the streaming hardware). In some examples, the number of multicast streams capable of being distributed to the client computing devices 104 is based on a network infrastructure that includes the server computing system 102, the client computing system 104, and any third party content providers. That is, a bandwidth limited network infrastructure would be able to distribute a fewer number of multicast streams as compared to higher bandwidth network infrastructures.

In some examples, the server computing system 102 determines that the number of additional multicast streams that are capable of being distributed to the client computing devices 104 is less than a total number of the client computing devices 104. For example, the server computing system 102 can determine that the number of additional multicast streams that are capable of being distributed to the client computing devices 104 is two (different) additional multicast streams. The server computing system 104 can compare the total number of the client computing devices 104 to the number of additional multicast streams that are capable of being distributed to the client computing devices 104. In this example, in response to the digital component requests 120 for supplemental digital components that will be presented in a different multicast stream than the multicast stream 200, the server computing system 102 determines that the number of different multicast streams providing the supplemental digital components (e.g., 2) is less than the number of client computing devices 104 providing the digital component requests 120 (e.g., 3). To that end, in the illustrated example, two or more of the client computing devices 104 will receive the same different multicast stream (e.g., from a third party content provider), described further herein.

In response to the digital component requests 120, the server computing system 102, and in particular, the digital component distribution server 112, selects multiple different supplemental digital components (operation C). Specifically, the server computing system 102 selects (multiple, different) supplemental digital components 150 that are stored by the digital components database 106. The server computing system 102 can select the supplemental digital components 150 based on one or more parameters of the respective client computing devices 104 and/or the multicast stream 200. For example, the parameters of the client computing devices 104 can include demographic characteristics, such as geographic characteristics of the client computing devices 104. Further, for example, the parameters of the multicast stream 200 can include content characteristics of the multicast stream 200, such as a category of the content (e.g., "sports" for a live sporting event). Continuing the example herein, for a multicast stream 200 of a live-sporting event, and for a demographic characteristic of "San Francisco, Calif." of a particular client computing device 104, the digital component distribution server 112 can select a supplemental digital component 150 based on i) a sports category and ii) a geographic characteristic of San Francisco, Calif. The digital component distribution server 112 can select the multiple different supplemental digital components 150 based on any appropriate selection method that is desired. The server computing system 102, and in particular, the digital component distribution server 112, selects the supplemental digital components 150 to distribute over at least a portion of the additional multicast streams that are capable of being distributed.

Referring to FIG. 1B, the server computing system 102, and in particular, the digital component distribution server 112, assigns different groups of the client computing devices 104 to different ones of the additional multicast streams that transport the multiple, different supplemental digital content 150 (operation D). For example, the digital component distribution server 112 assigns a first group 160 to the client computing devices 104a, 104b and a second group 162 to the client computing device 104c. The digital component distribution server 112 can group the client computing devices 104 according to any grouping method, e.g., based on the network infrastructure of the client computing devices 104, geographic proximity of client computing devices 104 to one another, etc. In some examples, the digital component distribution server 112 groups the client computing devices 104 based on similarity of parameters of the client computing devices 104, e.g., demographic profile characteristics. In some examples, the digital component distribution server 112 groups the client computing devices 104 randomly. In some examples, the number of groups the digital component distribution server 112 forms of the client computing devices 104 is based on the number of additional multicast streams that are capable of being distributed, and the number of client computing devices 104 (e.g., a ratio of the number of additional multicast streams that are capable of being distributed to the number of client computing devices 104).

In some examples, assigning the different groups of the client computing devices 104 to the different ones of the additional multicast streams includes excluding one of the client computing devices 104 from inclusion within any of the groups (e.g., groups 160, 162). That is, the digital component distribution server 112 determines that the supplemental digital content 150 is not applicable/appropriate for one of the client computing devices 104. For example, the different supplemental digital content 150 is for client computing devices 104 having a particular geographic characteristic (e.g., located in San Francisco), and the geographic characteristic of one of the client computing devices 104 is not the same as the particular geographic characteristic.

The server computing system 102, and specifically, the instruction generation server 114, generates data that instructs each of the client computing devices 104 to tune to one of the additional multicast streams that was assigned to the respective groups that includes the client computing devices 104 (operation E). For example, the instruction generation server 114 generates first tuning data 170a that instructs the client computing devices 104a, 104b of group 160 to each tune to a first additional multicast stream 220a, as shown in FIG. 2. Further, for example, the instruction generation server 114 generates second tuning data 170b that instructs the client computing device 104c of group 162 to tune to a second additional multicast stream 220b, as shown in FIG. 2. The first tuning data 170a and the second tuning data 170b are referred to collectively as tuning data 170. In some examples, the first additional multicast stream 220a differs from the second additional multicast stream 220b. In some examples, the first additional multicast stream 220a is the same as the second additional multicast stream 220b. The first additional multicast stream 220a and the second additional multicast stream 220b are collectively referred to as additional multicast streams 220.

The server computing system, and specifically, the ping address generation server 116, generates a client configurable ping address that includes a placeholder for insertion of a device identifier by the respective client computing device 104 (during operation F). For example, the ping address generation sever 116 generates a first client configurable ping address 180a that includes a placeholder for insertion of a unique device identifier by each of the client computing devices 104a, 104b; and further generates a second client configurable ping address 180b that includes a placeholder for insertion of a unique device identifier by the client computing device 104c. The first client configurable ping address 180a and the second configurable ping address 180b are referred to as client configurable ping addresses 180. In some examples, the client configurable ping addresses 180 indicate whether the client computing devices 104 have tuned to the additional multicast stream 220 (e.g., registered an impression of the supplemental digital content 150 of the additional multicast stream 220). That is, after registering an impression of the supplemental digital content 150, the client computing devices 104 insert (or append) a device identifier in the client configurable ping addresses 180.

In an example, the client configurable ping addresses 180 is of the form example.com/?streamID={streamID}, CID={clientID}. The client computing devices 104 insert respective unique device identifiers in the configurable ping address 180 at the "clientID" portion of the client configurable ping address 180, described further herein. Additionally, the client configurable ping addresses 180 can include data identifying which of the additional multicast streams 220 the respective client computing device 104 tuned to. For example, the "streamID={streamID}" portion can be populated with the stream identifier of the particular multicast stream to which the client computing device tuned, and therefore indicate which of the additional multicast streams 220 the respective client computing device 104 presented. The {streamID} can be populated by the server or the client computing devices 104.

The server computing system 102 responds to the digital component requests 120. Specifically, in response to the requests 120a, 120b, the server computing system 102 transmits the first tuning data 170a and the first client configurable ping address 180a to the client computing devices 104a, 104b (operation G). Further, in response to the request 120c, the server computing system 102 transmits the second tuning data 170b and the second client configurable ping address 180b to the client computing device 104c (operation H). In some examples, the server computing system 102 responds to the digital components request 120 substantially at a same time, given any network latency of the client computing devices 104. In some examples, the server computing system 102 responds to the digital component requests 120 within a few seconds or less of the point 210.

In some examples, the client computing devices 104 provide respective notifications, e.g., to the server computing system 102, that the respective client computing device 104 tuned to the additional multicast broadcasts that are received at destinations specified by the respective client configurable addresses. For example, the client computing devices 104a, 104b provide respective notifications that the client computing devices 104a, 104b tuned to the first multicast stream 220a and that are received at respective destinations that are specified by the first client configurable ping address 180a. Further, for example, the client computing device 104c provides a notification that the client computing device 104c tuned to the second multicast stream 220b and that is received at a destination that is specified by the second client configurable ping address 180b. The client configurable ping addresses 180a, 180b can be stored in a database by the server computing system 102. The server computing system 102 can parse the respective client configurable ping addresses 180 to determine which client computing devices 104 registered impressions of the additional multicast streams 220.

Continuing the example above, the client computing device 104a inserts a unique ID (e.g., "ID104a") into the ping address 180a for the additional multicast stream 220a (e.g., "220a"), e.g., example.com/?streamID={220a}, CID={104a}; the client computing device 104b inserts a unique ID (e.g., "ID104b") into the ping address 180b for the additional multicast stream 220a, e.g., example.com/?streamID={220a},CID={104b}; and the client computing device 104c inserts a unique ID (e.g., "ID104c") into the ping addresses 180c for the additional multicast stream 220b (e.g., "220b"), e.g., example.com/?streamID={220b}, CID={104c}.

Referring to FIG. 2, at a point 230 that is after point 210, each of the client computing devices 104 can tune back to the multicast stream 200 to again receive the multicast stream 200, e.g., after completion of receiving the appropriate additional multicast streams 220a, 220b. For example, when a last ping (e.g., playback of digital component complete ping) is transmitted by one of the client computing devices, transmission of this last ping can trigger the client computing device to tune back to the multicast stream 200. Alternatively, or additionally, a timer or another trigger signal can be used to trigger the client computing device 104 to tune back to the multicast stream 200. Using a timer or another trigger signal that is not tied to the last ping (or another ping) can enable the client computing devices 104 to retune to the multicast stream 200 at the appropriate time even when playback of the digital component did not complete. A countdown timer can be set, for example, to a duration of the digital component playback, such that the client computing device 104 can return to the multicast stream 200 when the timer reaches zero.

Figure 3:
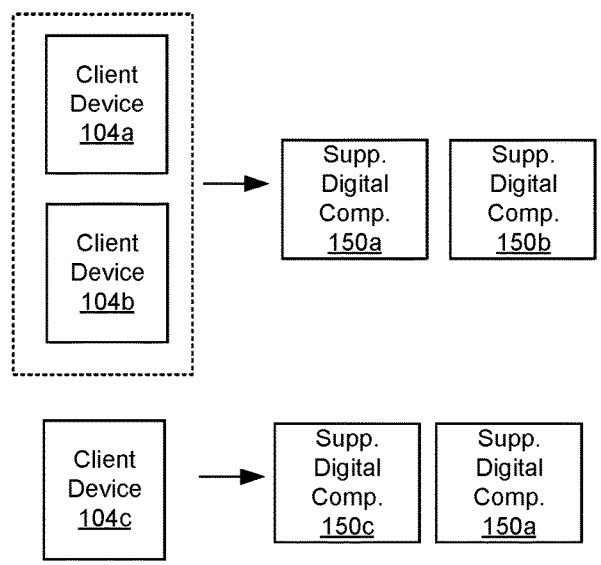
FIG. 3 illustrates supplemental digital components provided to the client computing devices.

FIG. 3 illustrates the supplemental digital contents 150 that are received by each of the client computing devices 104 of the appropriate different multicast streams 220a, 220b. For example, as mentioned herein, the client computing devices 104a, 104b receive the first additional multicast stream 220a. The first additional multicast stream 220a can include a first supplemental digital component 150a and a second supplemental digital component 150b. Further, for example, as mentioned herein, the client computing device 104c receives the second additional multicast stream 220b. The second additional multicast rate 220 can include a third supplemental digital component 150c and the first supplemental digital component 150a.

To that end, as shown by FIG. 3, the additional multicast streams 220a, 220b can include common supplemental digital components—e.g., both additional multicast streams 220a, 220b can include the first supplemental digital component 150a. In some examples, the additional multicast streams 220a, 220b can include the same supplement digital components arranged in differing orders (e.g., order of presentation of the supplemental digital components by the appropriate client computing device 104).

Figure 4:
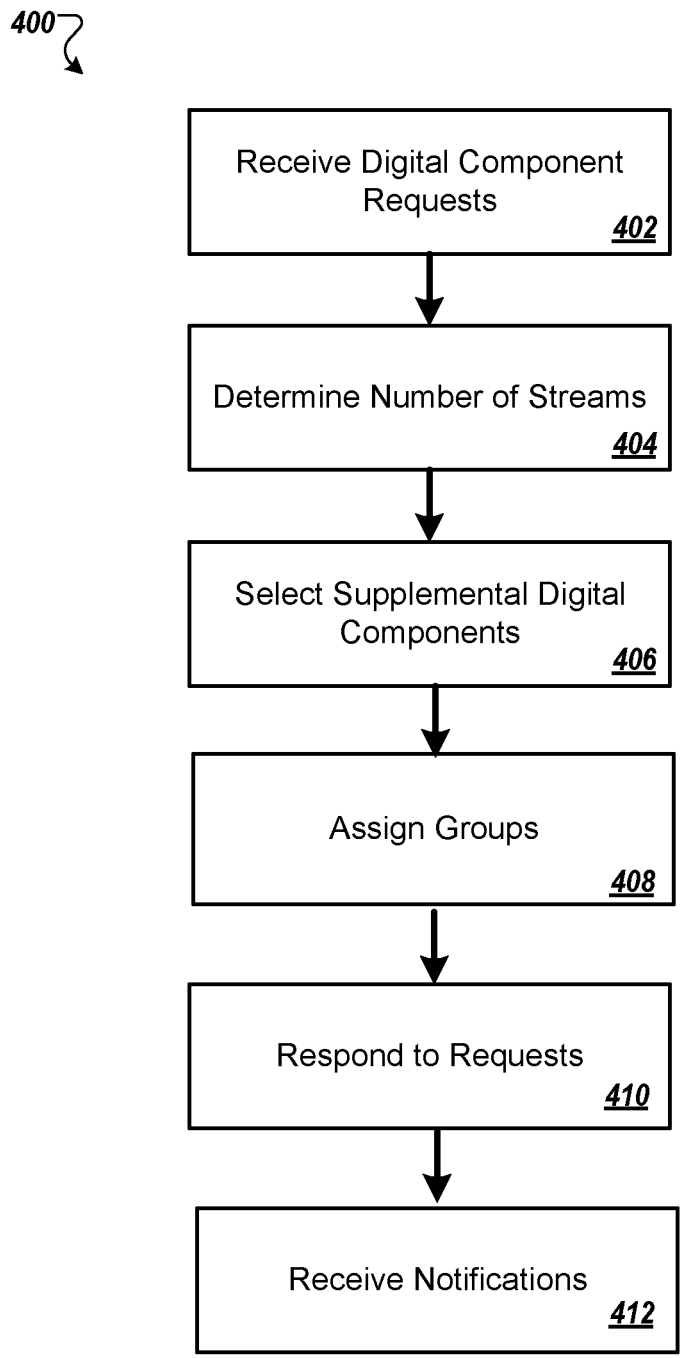
FIG. 4 illustrates an example process for multicast delivery of the digital components.

FIG. 4 illustrates an example process 400 for multicast delivery of digital content. The process 400 can be performed, for example, by the server computing system 102 and/or the client computing devices 104, or another data processing apparatus. The process 400 can also be implemented as instructions stored on computer storage medium, and execution of the instructions by one or more data processing apparatus cause the one or more data processing apparatus to perform some or all of the operations of the process 400.

Digital component requests are received from client computing devices (402). The digital component requests are requests for supplemental digital components that are delivered by a different multicast stream than the multicast stream that is delivering a particular stream of content to each of the multiple different devices. For example, each of the client computing devices that submitted one of the digital component requests can be tuned to a same streaming channel that is delivering a same set of streaming content (e.g., a particular sporting event).

Each of the requests can include various information about the client device that submitted the request and/or a user of the client device. For example, the various information can include a device type (e.g., tablet, mobile device, desktop, personal digital assistant), a device identifier, a user identifier of the user, a user profile of the user, a geographic location of the client device, or other information. Each of the requests can also specify that the request is for a supplemental digital component that will be presented during a break in the same set of streaming content that is being delivered to the multiple different client computing devices.

When the digital component requests are received, a number of additional multicast streams that are capable of being distributed to the client computing devices over an available bandwidth is determined (404). In some implementations, the number of additional multicast streams that are capable of being distributed is determined based on a current amount of bandwidth being used to distribute streaming content, a total amount of bandwidth available for distributing streaming content, and/or an amount of bandwidth required to deliver each stream that will carry digital components.

For example, assume that each multicast stream that will deliver digital components requires 6 MB/s of bandwidth, that the total amount of bandwidth available for distributing streaming content is 1 GB/s, and that 900 MB/s of bandwidth is currently being used to distribute streaming content. In this example, 100 MB/s of bandwidth are available to distribute additional multicast streams (e.g., 1 GB/s-900 MB/s), such that 16 additional multicast streams can be distributed to the client computing devices (e.g., (100 MB/s)/(6 MB/s)=16.67).

In some examples, the number of additional multicast streams capable of being distributed is less than a total number of the multiple different client devices that submitted digital component requests. For example, the number of device identifiers that were received in the digital component requests is counted, and compared to the number of additional multicast streams that are capable of being distributed. For purposes of example, assume that 32 different device identifiers were received in the digital component requests (e.g., according to a counter that is incremented each time a new device identifier is encountered). In this example, the number device identifiers (e.g., 32) is greater than the number of additional multicast streams that are capable of being distributed (e.g., 16). As such, a separate stream cannot be used to carry a different supplemental digital component to each of the client devices. Accordingly, some of the client devices will tune to a same streaming channel to view a same supplemental digital component.

In response to the separate requests, multiple different supplemental digital components are selected for distribution over at least a portion of the additional multicast streams that are capable of being distributed (406). In some examples, the supplemental digital components are selected based on the parameters of the respective client computing devices and/or the multicast stream. For example, as mentioned above, the parameters can include a device type (e.g., tablet, mobile device, desktop, personal digital assistant), a device identifier, a user identifier of the user, a user profile of the user, a geographic location of the client device, or other information. Further, the parameters of the multicast stream can include a category of the content of the multicast stream. For example, for a particular client computing device of a request, the supplemental digital components are selected based on the i) parameters of the client computing device and ii) content of the multicast stream (same streaming channel) that the particular client computing device was tuned to.

The client computing devices are assigned to different ones of the additional multicast streams that transport the multiple, different supplemental digital content (408). In some examples, the client computing devices are grouped together based on similar characteristics, e.g., proximity to one another, or similar demographic profiles of the user. For example, client computing devices can be grouped together that have similar geographic locations (e.g., same district within a city); or can be grouped together that have a same interest in sporting events. In some examples, the client computing devices are grouped together based on two or more similar characteristics (e.g., geographic characteristics, and demographic characteristics).

A response is generated for each of the digital component requests and is sent to respective client computing devices (410). In some examples, the responses include tuning data that instructs the client computing devices to tune to one of the additional multicast streams that was assigned to the different groups that includes the different client computing devices. For example, the tuning data causes the respective client computing devices to tune to one of the additional multicast streams per the group the respective client computing device belongs to. The response can further include client configurable ping addresses that include placeholders for insertion of device identifiers by the client computing devices. For example, the client computing devices can insert (or append) unique device identifiers into the client configurable ping addresses indicating the respective client computing device registered an impression of the appropriate additional multicast stream.

The client computing devices can transmit, to a destination identified by the respective client configurable ping addresses, a notification that the respective client computing device tuned to the appropriate additional multicast stream. That is, at a destination specified by the client configurable ping address, the notifications are received (412). For example, the notification can include the ping address indicating the unique client identifier of the respective client computing device, and the particular additional multicast stream the respective client computing device registered an impression of.

Figure 5:
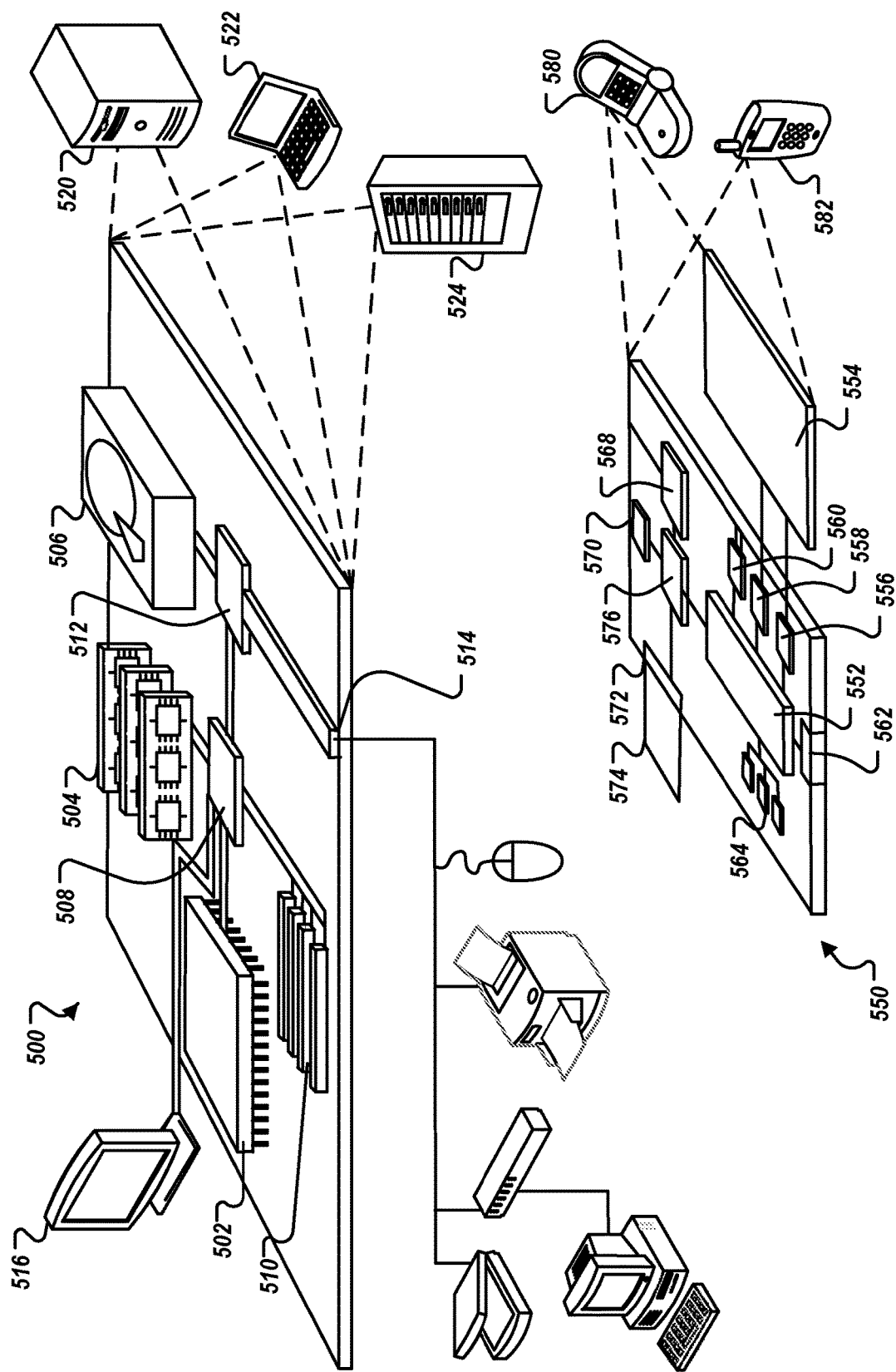
FIG. 5 illustrates an example computing system and mobile computing device that may be used to implement the techniques described herein.

FIG. 5 shows an example of a computer device 500 and a mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or a memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 640, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 648 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 554 may also be provided and connected to device 550 through expansion interface 552, which may include, for example, a SIMM (Single In Line Memory Module) card interface. Such expansion memory 554 may provide extra storage space for device 550, or may also store applications or other information for device 550. Specifically, expansion memory 554 may include instructions to carry out or supplement the processes described above, and may include secure information also. Thus, for example, expansion memory 554 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 554, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 550 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A method, comprising:
   receiving, by one or more computers and from multiple different client devices, separate digital component requests for a supplemental digital component;
   selecting, by the one or more computers, in response to the separate requests, multiple different supplemental digital components to distribute to the multiple different client devices;
   assigning, by the one or more computers, different groups of the multiple different client devices to different multicast streams that transport the multiple different supplemental digital components; and
   responding, by the one or more computers and to the multiple different client devices, to each of the separate requests with (i) data that instructs each of the multiple different client devices to tune to one of the different multicast streams that was assigned to the different groups that includes the different client device that submitted the request, and (ii) a client configurable ping address that includes a placeholder for insertion of a device identifier by the different client device that submitted the request.

2. The method of claim 1, wherein at least one group of the different groups includes two or more different client devices that are currently tuned to two separate multicast streams other than one of the different multicast streams that transport the multiple different supplemental digital components.

3. The method of claim 1, wherein the one of the different multicast streams is delivering a same streaming content to each of the multiple different client devices in a same group as the different device that submitted the request.

4. The method of claim 3, wherein receiving the separate digital component requests further includes receiving, for at least one digital component request, multiple different device identifiers in the digital component request, wherein the multiple different device identifiers specify multiple different devices that are to be provided a same digital component on a same multicast stream.

5. The method of claim 4, wherein a number of the digital component requests is less than a total number of the multiple different client devices.

6. The method of claim 1, further comprising:
   for one or more of the multiple client devices, receiving, at a destination specified by the client configurable ping address, a notification that the different client device tuned to the one of the different multicast streams that was assigned to the different group that includes the different client device that submitted the client configurable ping address; and
   storing the client configurable ping addresses in a database.

7. The method of claim 1, further comprising assigning the different groups to different ones of the different multicast streams based on demographic profile characteristics associated with each group.

8. The method of claim 7, wherein assigning the different groups of the multiple different client devices to different ones of the different multicast streams further comprises excluding a particular client device from inclusion within the each of the different groups.

9. A non-transitory computer-readable medium storing software comprising instructions executable by one or more computers which, upon such execution, cause the one or more computers to perform operations comprising:
   receiving, from multiple different client devices, separate digital component requests for a supplemental digital component;
   selecting, in response to the separate requests, multiple different supplemental digital components to distribute to the multiple different client devices;
   assigning different groups of the multiple different client devices to different multicast streams that transport the multiple different supplemental digital components; and
   responding to each of the separate requests with (i) data that instructs each of the multiple different client devices to tune to one of the different multicast streams that was assigned to the different groups that includes the different client device that submitted the request, and (ii) a client configurable ping address that includes a placeholder for insertion of a device identifier by the different client device that submitted the request.

10. The non-transitory computer-readable medium of claim 9, wherein at least one group of the different groups includes two or more different client devices that are currently tuned to two separate multicast streams other than one of the different multicast streams that transport the multiple different supplemental digital components.

11. The non-transitory computer-readable medium of claim 9, wherein the one of the different multicast streams is delivering a same streaming content to each of the multiple different client devices in a same group as the different device that submitted the request.

12. The non-transitory computer-readable medium of claim 11, wherein receiving the separate digital component requests further includes receiving, for at least one digital component request, multiple different device identifiers in the digital component request, wherein the multiple different device identifiers specify multiple different devices that are to be provided a same digital component on a same multicast stream.

13. The non-transitory computer-readable medium of claim 12, wherein a number of the digital component requests is less than a total number of the multiple different client devices.

14. The non-transitory computer-readable medium of claim 9, wherein the instructions cause the one or more computers to perform operations further comprising:
   for one or more of the multiple client devices, receiving, at a destination specified by the client configurable ping address, a notification that the different client device tuned to the one of the different multicast streams that was assigned to the different group that includes the different client device that submitted the client configurable ping address; and
   storing the client configurable ping addresses in a database.

15. A system comprising:
   one or more memory devices; and
   one or more computers configured to execute instructions stored on the one or more memory devices, wherein execution of the instructions cause the one or more computers to perform operations comprising:
      receiving, from multiple different client devices, separate digital component requests for a supplemental digital component;
      selecting, in response to the separate requests, multiple different supplemental digital components to distribute to the multiple different client devices;

assigning different groups of the multiple different client devices to different multicast streams that transport the multiple different supplemental digital components; and responding to each of the separate requests with (i) data that instructs each of the multiple different client devices to tune to one of the different multicast streams that was assigned to the different groups that includes the different client device that submitted the request, and (ii) a client configurable ping address that includes a placeholder for insertion of a device identifier by the different client device that submitted the request.

16. The system of claim 15, wherein at least one group of the different groups includes two or more different client devices that are currently tuned to two separate multicast streams other than one of the different multicast streams that transport the multiple different supplemental digital components.

17. The system of claim 15, wherein the one of the different multicast streams is delivering a same streaming content to each of the multiple different client devices in a same group as the different device that submitted the request.

18. The system of claim 17, wherein receiving the separate digital component requests further includes receiving, for at least one digital component request, multiple different device identifiers in the digital component request, wherein the multiple different device identifiers specify multiple different devices that are to be provided a same digital component on a same multicast stream.

19. The system of claim 18, wherein a number of the digital component requests is less than a total number of the multiple different client devices.

20. The system of claim 15, wherein the instructions cause the one or more computers to perform operations further comprising:

for one or more of the multiple client devices, receiving, at a destination specified by the client configurable ping address, a notification that the different client device tuned to the one of the different multicast streams that was assigned to the different group that includes the different client device that submitted the client configurable ping address; and storing the client configurable ping addresses in a database.

* * * * *